INVENTOR
VAN C. MARTIN
BY Francis V. Giolma
ATTORNEY

Dec. 20, 1966 V. C. MARTIN 3,292,530

PRINT HEAD CONTROLS CAUSING OVERTRAVEL OF HEAD AT LEFT END

Filed Nov. 5, 1964 14 Sheets-Sheet 4

Dec. 20, 1966 V. C. MARTIN 3,292,530

PRINT HEAD CONTROLS CAUSING OVERTRAVEL OF HEAD AT LEFT END

Filed Nov. 5, 1964 14 Sheets-Sheet 6

Dec. 20, 1966 V. C. MARTIN 3,292,530

PRINT HEAD CONTROLS CAUSING OVERTRAVEL OF HEAD AT LEFT END

Filed Nov. 5, 1964 14 Sheets-Sheet 10

Dec. 20, 1966 V. C. MARTIN 3,292,530

PRINT HEAD CONTROLS CAUSING OVERTRAVEL OF HEAD AT LEFT END

Filed Nov. 5, 1964 14 Sheets-Sheet 13

United States Patent Office 3,292,530

Patented Dec. 20, 1966

3,292,530

PRINT HEAD CONTROLS CAUSING OVERTRAVEL OF HEAD AT LEFT END

Van C. Martin, Endicott, N.Y., assignor to International Business Machines Corporation, New York, N.Y., a corporation of New York Filed Nov. 5, 1964, Ser. No. 409,084
7 Claims. (Cl. 101—93)

This invention relates generally to printers, and it has reference in particular to controls for a serial matrix wire printer.

Generally stated, it is an object of this invention to provide improved controls for a serial matrix wire printer.

More specifically, it is an object of this invention to provide for positioning a print head at the left margin of a document by causing a predetermined overtravel of the head to the left during its return, and the incrementing the head to the right to return it to the first print position.

Another object of the invention is to provide for travel of the print head in a serial matrix printer to the right margin upon reset, before returning it to the left margin.

It is also an object of this invention to provide for using a feedback signal from the print head drive mechanism for stopping the print head in a serial matrix printer during incrementing, and for using an inhibit signal for preventing stopping of the print head in response to spurious stop signals before an increment occurs.

Another object of the invention is to provide for interlocking operation of a serially related switch device and a bridge circuit of silicon-controlled rectifier devices controlling a reversible drive motor.

Yet another object of this invention is to provide for controlling incrementing of a print head in a serial matrix printer, by signals generated by the print wire driving mechanism.

It is also one of the objects of this invention to provide for incrementing a print head from one print position to the next in one direction, and for effecting a rapid return thereof from one margin to the other in the other direction.

Another object of the invention is to provide for producing a common signal for effecting setup of a plurality of print wires in a serial matrix printer and for effecting operation of a motor to move the print head to the next print position, and controlling the relative timing thereof in accordance with operation of a print wire drive mechanism.

A still further object of this invention is to provide for advancing a print head in a serial matrix wire printer by effecting energization of the print head drive motor for a predetermined movement thereof, then effecting reverse energization of the motor for a predetermined timed interval to bring the motor to a stop.

In practicing the invention in accordance with a preferred embodiment thereof, a print head for a 5 x 7 wire matrix serial printer is incremented across the print line by being mounted on a steel tape driven by a reversible print head motor. Setup of the print wires in the matrix is controlled by a modified punch print wire drive mechanism which advances selected wires to form a character in accordance with data decoded from a single character register.

The print head is incremented by energizing the print head motor in the forward direction in response to emitter signals from the print wire drive mechanism, and reversely energizing the motor by means of a feedback signal derived from an emitter on the motor shaft to stop the print head in the next print position.

Return of the head is initiated by either an End of Line signal from a central processing unit supplying the data to be printed, or from a signal from a Right Margin sense switch. The return is rapid, the head being allowed to overshoot the left margin of the document before being stopped by reverse energization of the head drive motor. It is then incremented until it reaches the first print position of the document, so as to accurately position the print head without requiring the usual detents.

The foregoing and other objects, features and advantages of the invention will be apparent from the following more particular description of a preferred embodiment of the invention, as illustrated in the accompanying drawings.

Figure 1:
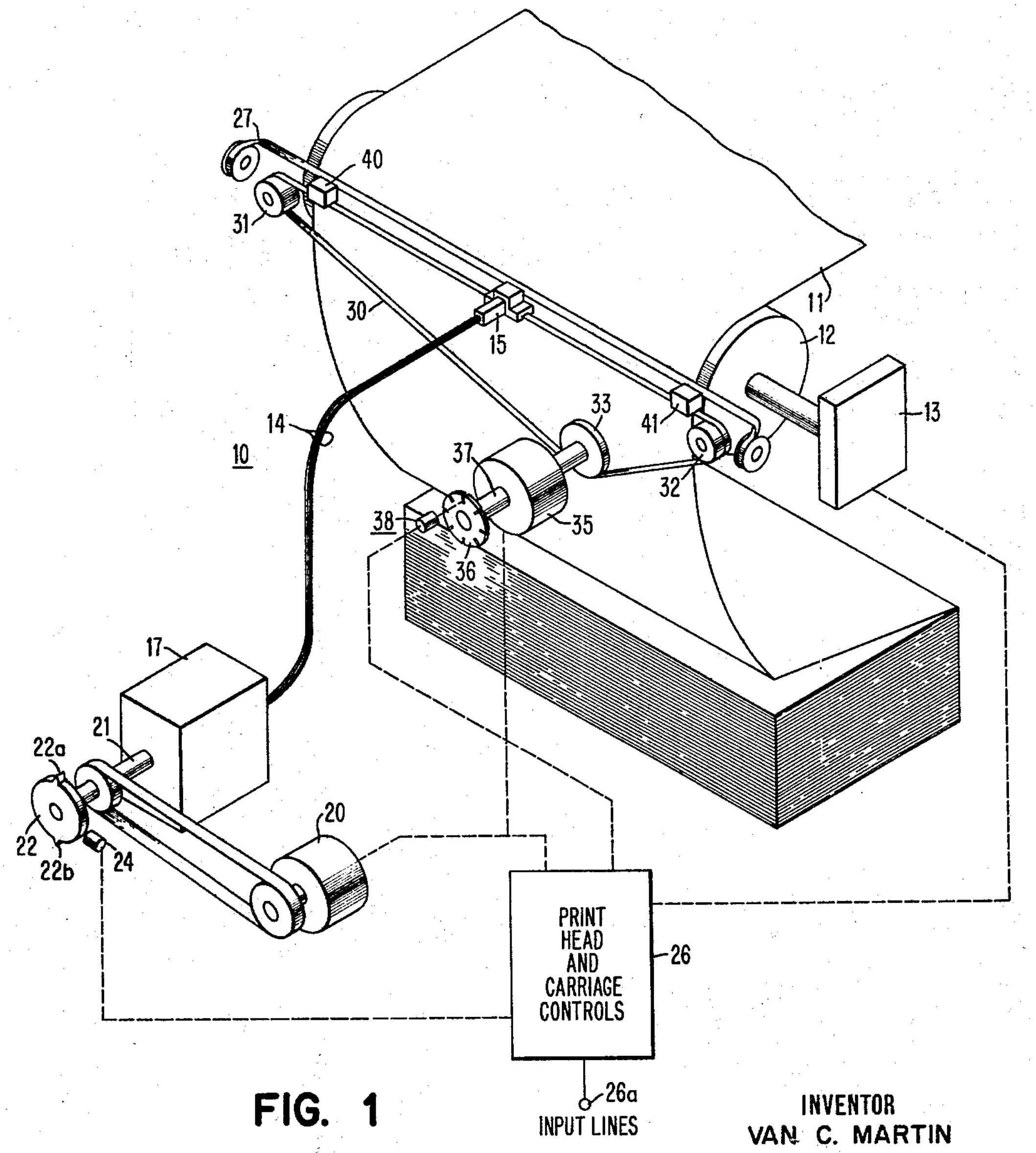
FIG. 1 is a schematic isometric view of the printer showing the general arrangement of the mechanism and controls.
Figure 8:
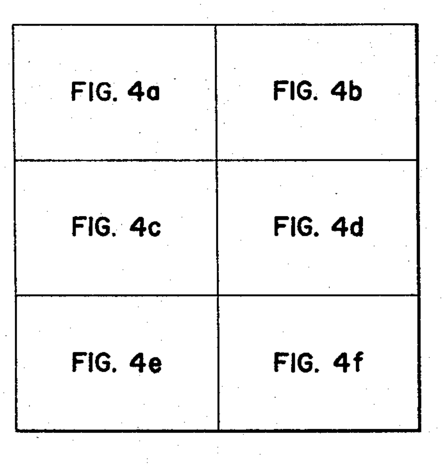
Figure 5:
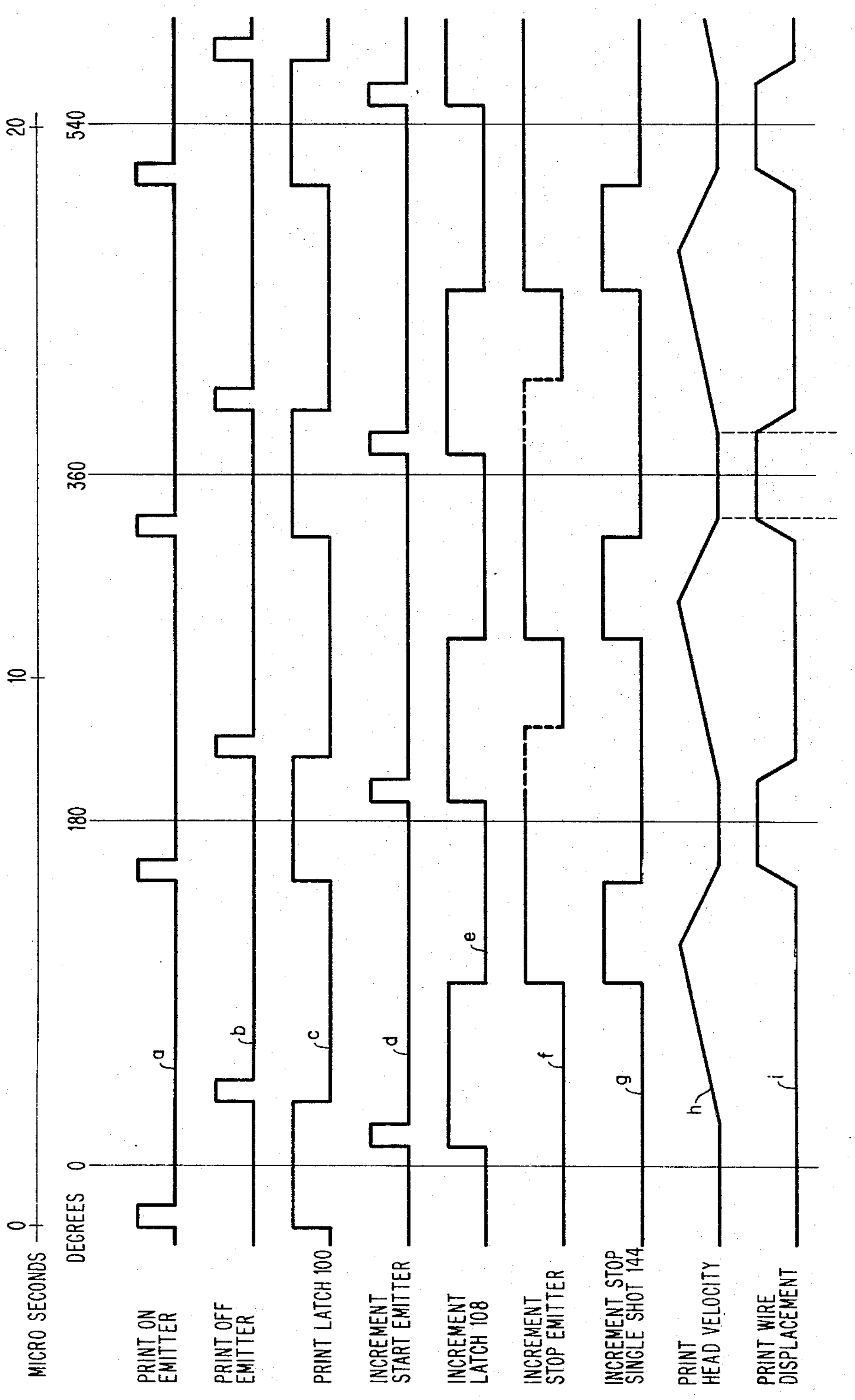
Figure 6:
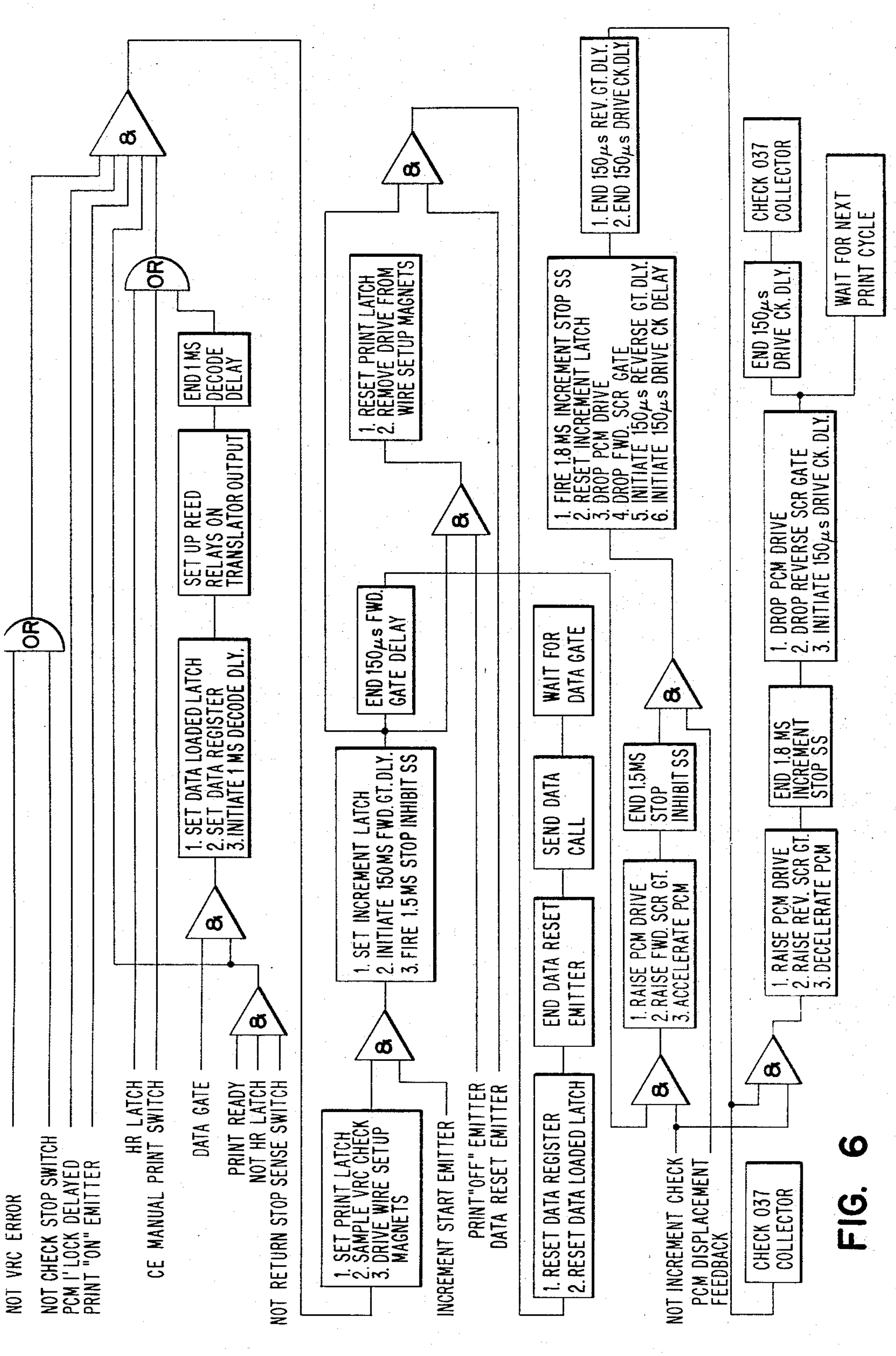
Figure 7:
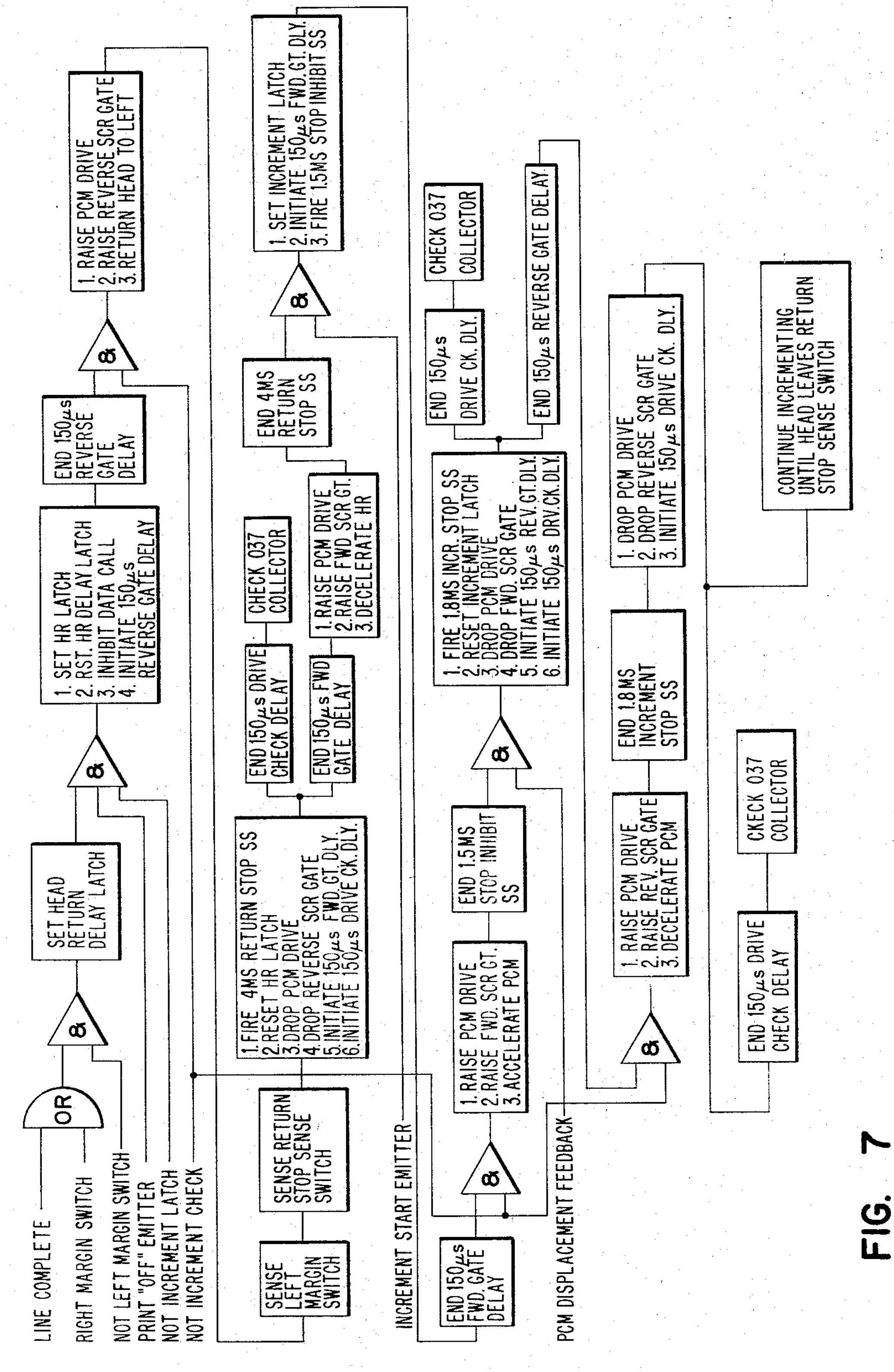
Figure 9:
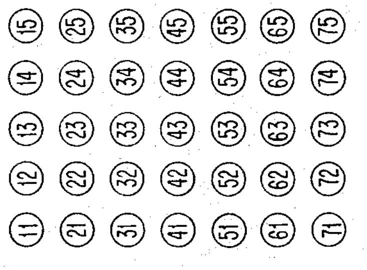
Figure 10A:
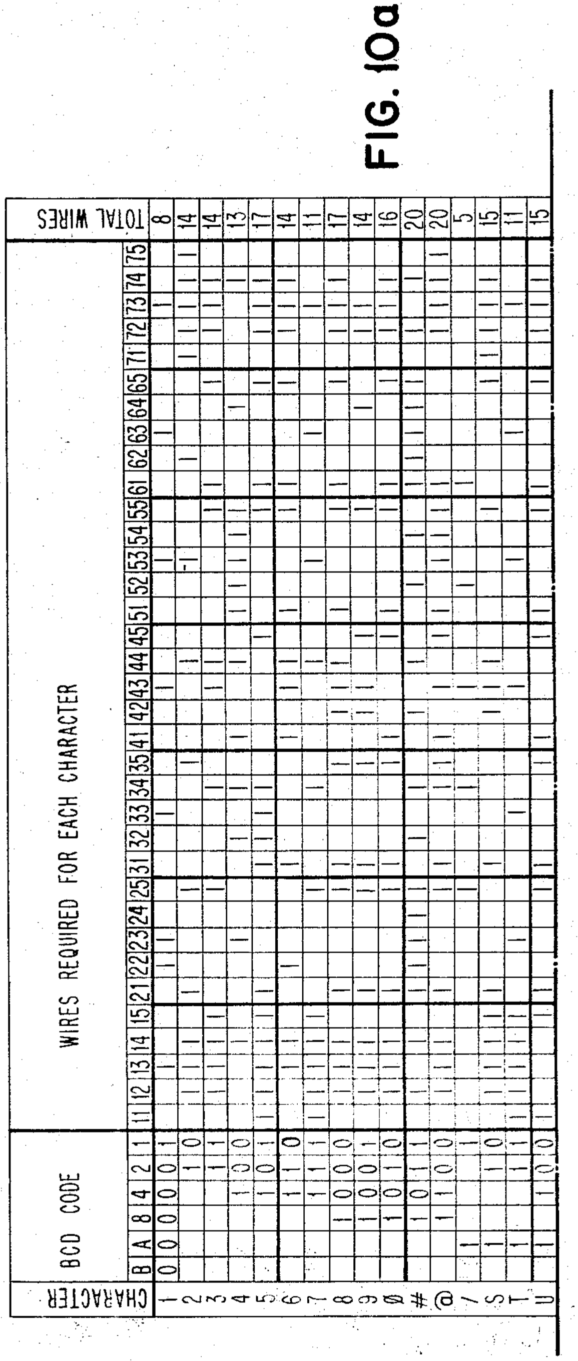
Figure 10B:
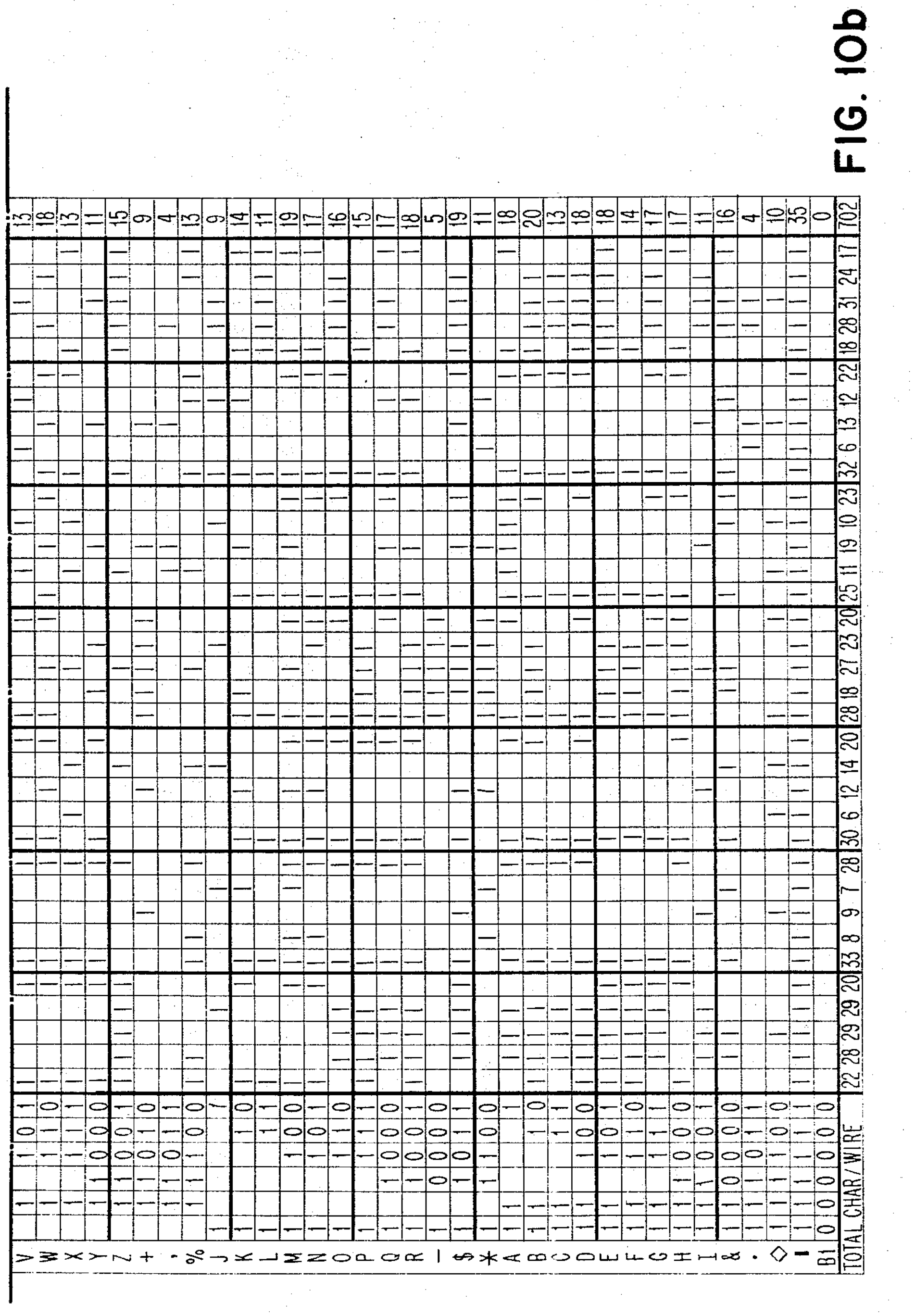

FIGS. *4a–4f* taken together, form a schematic diagram of the control circuitry for the printer of FIG. 1;

FIG. 5 is a timing chart showing the relative timing of different emitter pulses relative to movement of the print head and print wires;

FIG. 6 is a logic flow diagram chart showing a normal character cycle sequence of operations for the serial matrix printer;

FIG. 7 is a chart showing a logic flow diagram for a head return operation;

FIG. 8 is a diagram showing the arrangement of FIGS. *4a–4f*;

FIG. 9 is a diagram showing the numbering of the print wires and the 5 x 7 matrix, and FIGS. 10*a* and 10*b* taken together, provide a table relating binary coded decimal characters to the numbers of print wires required for each of the characters which the printer is arranged to print.

Referring particularly to FIG. 1, the reference numeral 10 denotes generally a serial matrix wire printer mechanism generally of the type shown and described in the copending application of Clyde J. Fitch and Fred Saltz, entitled "Incremental Printer and Printer Plotter," application Serial No. 157,187 (Docket 6274), filed December 5, 1961 and assigned to the assignee of the present invention. As described therein, a print medium 11, such as a continuous forms paper document is moved past the print line by any conventional means, including a platen 12 driven by a suitable carriage drive means 13. The mechanism for positioning and advancing the paper may take the form of any one of a number of mechanisms which are well-known to the art, having the capability of advancing the paper one or more line spaces at a time in coordination with the printing portion of the cycle of operation. The printing of characters on the paper 11, as described therein is obtained from a printing unit having a plurality of longitudinally movable print wires 14, grouped together at one end to form a matrix in a movable print head 15. The wires 14 are arranged in a bundle in a suitable manner to provide a flexible configuration between the print head 15 and the print wire drive mechanism 17 so as to permit ready movement of the print head from one print position to the next, and the return thereof to the first print position for starting another line.

In accordance with principles known in the printing art, each of the print wires is selectively, individually movable longitudinally to form in combination with other wires various characters at the matrix print head 15. Selective movement of the different print wires is under the control of a print wire drive mechanism 17 which is driven by means of a motor 20. The drive means 17 is provided with an emitter 22, on shaft 21, belt driven by motor 20, having projecting pole pieces 22*a* and 22*b* diametrically opposite for cooperating with one or more pickup means represented by the pickup element 24 to produce timed output signals (details on the drive mechanism 17 will be explained hereinafter). The print wires 14 are selectively advanced in a manner to be described more fully hereinafter by print head and carriage controls shown generally at 26, adapted to receive coded electrical input signals from a computer, transmission line, data card, magnetic tape, or the like. Character imprints are formed on the print medium 11 when different ones of the imprint wires defining a character are driven forward or advanced from the matrix print head 15 to strike a ribbon 27 against the paper 11 or are impinged against by the ribbon and paper in a well-known manner.

The print head 15 is mounted on a metal tape 30 which passes around the pulleys 31 and 32 at opposite ends of the form and around a drive pulley 33 driven by a print head drive motor 35. The motor 35 is controlled by the controls 26, and is provided on shaft 37 with a feedback emitter consisting of a slotted disc 36 cooperative with a light source and a photocell unit 38 to provide feedback signals to the controls 26 in a manner which will be described hereinafter. The numerals 40 and 41 designate generally limit switches adapted to be engaged by the print head 15 for controlling the movement thereof in a manner which will also be described in detail hereinafter.

As previously stated, the printing of characters on the print medium 11 is effected by selectively setting up or driving various combinations of print wires 14 so that the ends thereof strike the print ribbon 27 against the document 11. The mechanism 17 for driving the print wire may be more clearly understood by reference to FIG. 2. As shown therein, each of the print wires, which may be represented by the single print wire 14, is slidably disposed in a suitably supported flexible guide tube 14*a* and is secured at its end remote from the print head 15 to a drive slug 42 which may be slidably supported between support plates 43*a* and 43*b*, being retained by the curved edge of a retainer plate 43*c* in a cooperating notch 42*a* in the slug. The print slug 42 is disposed to be actuated by a cam and lever mechanism substantially identical with that disclosed in Patent 3,002,678, which issued on October 3, 1961 to Charles S. Jackowski. For example, the actuating means for the print slug 42 comprises an actuating lever 45 supported on a pivot 47 and having an end portion 45*a* positioned beneath the drive slug 42, while the other end is provided with a shoulder portion 49 disposed to engage a corresponding shoulder portion 50 on a latch armature 52 pivotally supported on an E shaped magnetic core 54 and biased by means of a spring 57 to the latched position as shown. A solenoid 58 having a terminal 59 is provided on the central leg 54*b* of the core 54 for attracting the armature 52 to release the actuator 45, whereupon it will be biased in a counterclockwise direction by means of spring 57 to move beneath the projecting end 62*b* of an interposer 62 which is supported on a pivot 63, in turn supported by an interposer lever 65 which is pivotally supported in a pivot 66 and biased in a counterclockwise direction by means of a spring 67. The interposer 62 is provided with a shoe portion 62*a* which slidably bears against a fixed support 64 to prevent clockwise rotation of interposer 62 from the position shown, and lever 65 is provided with a reset shoe 65*a* for engaging a cam 70 which is provided on the shaft 21 having lobes 70*a* and 70*b* diametrically disposed. As shown, the lobes 70*a* and 70*b* are substantially aligned with the poles 22*a* and 22*b* of emitter 22 (shown in dotted outline). A restoring lever 72 is provided, having an arm or fork 72*a* disposed in a recess 42*b* of the drive slug, and a second fork 72*b* arranged to follow the cam 70, and retract the drive slug 42 when it has been advanced.

Advance of the drive slug 42 to set up print wire 14 is effected by energizing the solenoid 58 to attract the armature 52 and release the actuator lever 45. Biased by the spring 57, the actuator lever 45 rotates in a counterclockwise direction, and as the cam approaches its low position, end 45*a* drops beneath the projecting end 62*b* of the interposer 62 which is thereupon urged to the right under the action of the spring 67 to ride over the projecting end 45*a* of the actuator. As the high lobe 70*b* of the cam approaches the actuator 45, it raises the actuator end 45*a* with the interposer disposed between the actuator and drive slug 42, thus advancing the drive slug sufficiently to drive the print wire 14 to effect printing. As the cam 70 continues to rotate, shoe 65*a* is urged to the left to withdraw the interposer 62, and the restoring lever 72 is urged in a counterclockwise direction to withdraw the drive slug 42 and the wire 14. The actuator lever 45 latches up with armature 52, and interposer 62 is biased by spring 67 to the position shown, abutting lever 45. Each of the print wires is provided with a drive slug, actuator and interposer mechanism, together with an associated solenoid 58 as hereinbefore described; and setup of the print wires is effected by selectively energizing the solenoids 58 of the different print wires necessary to form a particular character.

Figure 3:
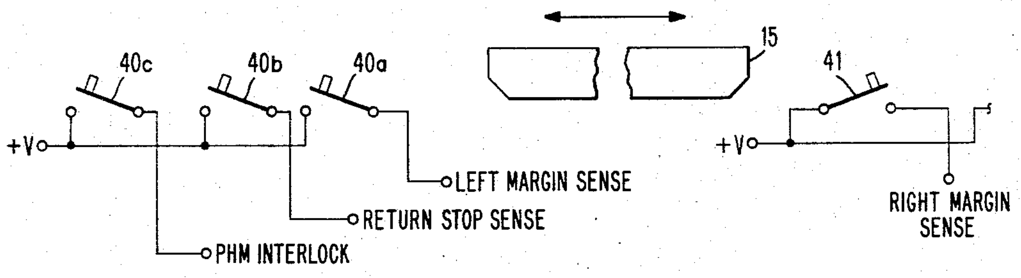
FIG. 3 is a partial enlarged schematic diagram illustrating the arrangement of the limit switches of FIG. 1.

Referring to FIG. 3 it will be seen that the limit switch designated generally by the numeral 40 in FIG. 1 is shown schematically, and may comprise a Left Margin Sense switch 40*a*, a Return Stop Sense switch 40*b*, and an Interlock switch 40*c*, each of which is actuated by the print head 15. The switches may be of any suitable type such as any of the well-known microswitches, and are so positioned that the left edge of the print head 15 can successively close the switches of 40*a* and 40*b* which are about one print position (.10 in.) apart while Interlock switch is approximately three print positions further to the left and can overtravel the switches 40*a* and 40*b* several print positions while still holding them closed. The opening of switch 40*b* when the print head is moving to the right is utilized to accurately position the print head at the first print position as hereinafter explained. The closing of switch 40*a* is utilized to develop an Advance signal for the carriage, while closing of the Interlock switch 40*c* is utilized to indicate excessive overtravel of the head. A similar Interlock switch (not shown) may be used at the right end of the form in conjunction with the Right Margin Sense switch 41, shown.

Referring to FIGS. 4*a*–4*f*, it will be seen that binary coded decimal data is supplied over the input lines 26*a* to a register 80 comprising a plurality of latches 80*a*–80*g* and a plurality of AND circuits 82*a*–82*g* in conjunction with a gating signal from a Data Loaded latch 84. Reset of latches 80*a*–80*g* is effected by the output of OR circuit 78. OR circuits 81*a*–81*g* are utilized for switching manual entry input lines 26*b* to the data register 80 alternately with the signals from the AND circuits 82*a*–*g*. The Data Loaded latch 84 is set by the output of AND circuit 86 having as its input a Data Gate signal over input line 85 from the central processing unit, along with the output from an AND circuit 87 which ANDs a Print Ready signal, a Carriage Settled signal at terminal 83 which indicates that the printer carriage is properly positioned, together with the inverted signal from the Return Stop Sense limit switch 40*b* through inverter 88, and the Off output of a Head Return latch 90 over line 91. AND circuit 97 provides a Carriage Advance signal in response to the Off output of the Head Return latch 90 and the Head Reset latch 104, together with the output of OR circuit 162.

Data bits received over lines 26*a* from a central processing unit are stored in the latches of register 80 and are used to control the setup of the print wires 14 by being applied selectively to windings 89a–n of reed switches 80A–N to operate particular ones of the plurality of the reed switches for providing circuits to the interposer magnets 58 of particular ones of the print wires through a print matrix translator 93 comprising a well-known arrangement of AND circuits 92a–n and OR circuit 94a–n in accordance with the table of FIGS. 10a and 10b. Activation of the selected interposer magnets 58 is effected over line 95 from a magnet driving circuit 96, which is operated in response to the output of an AND circuit 98, which ANDs the On output of a Print Latch 100, together with a $\overline{\text{Check Reset}}$ (Not Check Reset) signal obtained by inverting the Check Reset signal from terminal 102 over line 101 through inverter 103, and a $\overline{\text{Head Reset}}$ signal obtained from the Off output of a Head Reset latch 104. These latter two signals prevent printing during a reset operation.

The Print Latch 100 is used to simultaneously provide a gating signal to AND circuit 98 to effect operation of the print magnets 58, and also effect operation of the print head drive motor 35 by applying a signal over line 106 to an Increment Latch 108 which is used to effect incrementing of the print head motor 35. OR circuit 107 provides for reset of Print Latch 100.

Operation of the Print Latch 100 is obtained through the output of an AND circuit 110 which gates the output of an OR circuit 109 with the output signal from the AND circuit 87 and the output of an AND circuit 112 which ANDs the Print On timing signal from emitter pickup 24c, which produces a timed pulse as represented by curve a in FIG. 5. This emitter signal is ANDed in the AND circuit 112 with the output of an AND circuit 114, which in turn AND's the delay output of the Data Loaded latch 84 through a 1 millisecond delay circuit 116 and an OR circuit 117, where it is mixed with a manual print signal from a control switch 99 and the On output of the Head Reset latch 104. ANDed with the output of OR circuit 117 in AND circuit 114 is a delayed signal over line 120 from a delay circuit 121, in response to the output line of AND circuit 122, which ANDs signals from the logic power supply and the power supplies supplying the print magnets 58, indicating these supplies are readily. Emitter 22 is provided with a plurality of other magnetic pickups 24d, 24e and 24f to provide respectively Print Off, Data Reset, and Increment Start signals, such as represented by the curves b and d of FIG. 5, respectively.

The Increment Start emitter signal from pickup 24f is applied through AND circuit 124 with the output of OR circuit 123 to the Increment Latch 108 for turning the latch on to produce a signal over line 126 which is applied through OR circuit 128 and AND circuit 130 to the Forward Gate delay 132 and inverter 133 for providing a negative Forward Silicon-Controlled Rectifier gate signal after a delay of 150 microseconds, and applying a signal to OR circuit 134 and AND circuit 136 to produce a print head motor drive signal to operate the print head motor 35 for incrementing the print head 15.

The emitter disc 36 connected to the print head motor drive shaft 37 is provided with a plurality of fingers 36a defined by slots 36b which are positioned approximately 5° apart, and which cooperate with the light source 38a and the photosensitive device 38b of unit 38 to provide feedback pulses over line 140 to AND circuit 142 for turning on an Increment Stop single shot or monostable multivibrator 144. This provides a timed pulse of 1.8 milliseconds duration which is applied to the Reverse Gate delay circuit 146 through AND circuit 148 and OR circuit 150 for producing a negative signal through inverter 143 for reversibly energizing the print head drive motor 35 to bring it to a quick stop. The Increment Start signal is also applied over line 152 to a Stop Inhibit single shot and an inverter 154 and 156, respectively, for preventing the acceptance of a Stop signal from the feedback emitter 36 for the duration of the single shot timing, to prevent stopping the motor prior to incrementing as a result of spurious feedback signals.

Return of the print head to start another line is effected through operation of the Head Return Delay latch 160 which is turned on in response to either the closing of the Right Margin Sense limit switch 42 or to a Line Complete signal from the central processing unit, indicating the end of a line, through the OR circuit 162 and AND circuit 164, where the output of OR 162 is ANDed with the inverted Left Margin Sense limit switch 40a through inverter 163. The On output of the Head Return Delay latch 160 is applied to the Head Return latch 90 through AND circuit 166, together with the Off output of the Increment Latch 108 and the Print Off emitter signal from emitter pickup 24d. Operation of the Head Return latch 90 supplies a signal over line 168, through OR circuit 150, and AND circuit 148 to Reverse Gate Delay circuit 146 and inverter 147 for effecting a negative Reverse Silicon-Controlled Rectifier gate signal for operating the print head motor 35 to return the head to the left.

The armature of the 35a of the print head motor 35 is connected in a bridge circuit of Forward-Upper and Forward-Lower Silicon-Controlled Rectifiers SCR1 and SCR2, respectively, and Reverse-Upper and Reverse-Lower Silicon-Controlled Rectifiers SCR3 and SCR4, respectively. One side of the bridge circuit is connected to a suitable source of power through conductor 170 while the opposite side is connected by means such as the cascade connection of transistors T5 and T6 to ground to complete the circuit. The transistor T5 is gated by an input at terminal 172 of transistor T6 from the motor drive AND circuit 136. SCR1–SCR4 are selectively gated by transistors T1, T2 to connect the armature to conductor 170 in response to a signal on terminal 174 from the Forward Gate Delay circuit 132, and by transistors T3 and T4 in response to a signal on terminal 175 from the Reverse SCR Gate Delay circuit 146, respectively.

In order to check the validity of a character in the register 80, an odd bit parity check circuit 180 (FIG. 4b) is provided for operating a Character Check latch 182 whenever an invalid character exists. Signals from the latches 80a–80g are ANDed in a plurality of AND circuits 184a–184f, OR circuits 185a–185c, inverter circuits 186a–186c, AND circuits 187a–187d, OR circuits 188a and 188b, inverter circuits 189a and 189b, AND circuits 190a and 190b, OR circuit 191, and AND circuit 192 where the output is ANDed with a $\overline{\text{Head Reset}}$ signal from the Off output of latch 104 for operating the latch 182 in response to a check sample signal from the AND circuit 112 through AND circuit 193. The latch will be turned on if the character does not have the odd bit parity called for. A Check Stop switch 173 and inverter 174 provide a signal through OR circuit 183 for disregarding the check circuit 180 if desired. A Forms Interlock switch 175 operates to indicate a broken form.

In order to protect the print head motor drive circuit, a motor check circuit 200 is provided which ANDs the Forward-Upper and Reverse-Lower, the Reverse-Lower and Forward-Lower, as well as the Forward-Upper and Reverse-Upper, and Reverse-Upper and Forward-Lower SCR gate signals to provide a check signal for any combination of a forward and reverse Silicon-Controlled Rectifier on at the same time. This signal is applied through AND circuits 202a–202d, OR circuit 203, AND circuit 205, to an OR circuit 206 for operating the Increment Check latch 204 to indicate an error. Latch 204 is also operated by the output of AND circuit 201 if the head increments when it should not. A Printer Reset signal resets latch 204.

Should the transistor T5 fail to turn off between drive reversals of the motor 35, the Silicon-Controlled Rectifiers would not reset. When the next pair of Silicon-Controlled Rectifiers is gated on, all four Silicon-Controlled Rectifiers would start, creating a catastrophic condition. Check circuit 205 monitors the collector voltage of the transistor T5 each time its input drive goes off. If the transistor is still saturated after 150 microseconds, the output of the delay circuit 210 is gated with the collector signal in AND circuit 212 to turn on the Increment Check latch 204 through OR circuit 206. The Off output of the Increment Check latch 204 is utilized through OR circuit 183 with the Off output of Character Check latch 182 through an AND circuit 214 to provide the Print Ready signal utilized in the AND circuit 87 for turning on the Data Loaded latch 84 at the beginning of an operation. OR circuit 207 mixes signals from the Print Head Motor Interlock switch 41 with the output of the Increment latch 204 to turn on indicator 209 and AND circuit 211 allows the head to be reset while in overtravel, without turning Check latch 204 on.

In operation it will be seen by referring to the diagram of FIGS. 4*a*–4*f* and to the flow diagram in FIG. 6 that data supplied over the lines 26*a* is loaded into the latches 80*a*–80*g* of the Data Register 80 through OR circuits 81*a*–81*g* and AND circuits 82*a*–82*g* in conjunction with the output signal of the Data Loaded latch 84. The Data Loaded latch 84 is turned on to indicate that data is present for printing in response to a Data Gate signal from the central processing unit over line 85 through AND circuit 86, in conjunction with the output of AND 87 which ANDs a Print Ready signal from the AND circuit 214, a Carriage Settled signal at terminal 83 indicating that the carriage is conditioned, a $\overline{\text{Return Stop}}$ sense signal over line 220 from inverter 88 and the Return Stop sense switch 40*b*, and a $\overline{\text{Head Return}}$ signal from the Head Return latch 90 over conductor 91. The On output of the Data Loaded latch 84 is applied over conductor 222 to AND circuits 82*a*–82*g* for gating the data into the data register 80. The On output of the Data Loaded latch 84 also initiates a 1 millisecond decode delay through the delay circuit 116 to provide reed pick time. This signal after a delay of 1 millisecond is applied to the OR circuit 117, and thence to the AND circuit 114 in conjunction with the Delayed Interlock signal from AND 122 and delay 121 over line 120 indicating the logic and magnet driver power supplies are ready. The output of AND circuit 114 is applied to AND circuit 112 in conjunction with the Print On emitter signal from the emitter pickup 24*c* to turn on the Print Latch 100 through AND circuit 110. During the delay produced by the delay circuit 116, the register latches 80*a*–80*g* energize selected ones of the operating windings 89*a*–89*n* to set up their respective reed switches 89A–89N in accordance with the outputs of the translator 93. At the end of this delay when the Print Latch 100 is turned on through AND circuit 110 to apply the output to AND circuit 98 in conjunction with the $\overline{\text{Reset}}$ signal from the inverter 103 and the $\overline{\text{Head Reset}}$ signal from the Off output of the Head Reset latch 104 to turn on the magnet driver 96 and drive the print magnets 58 selected by the reed switches 89A–89N through the translator 93. At the same time that the output of the AND circuit 112 is applied to the Print Latch 100 through AND circuit 110, this signal is also applied over conductor 224 to AND circuit 193 for gating the output of the check circuit 180 to effect operation of the Character Check latch 182 if the character in the register is an invalid one.

Figure 2:
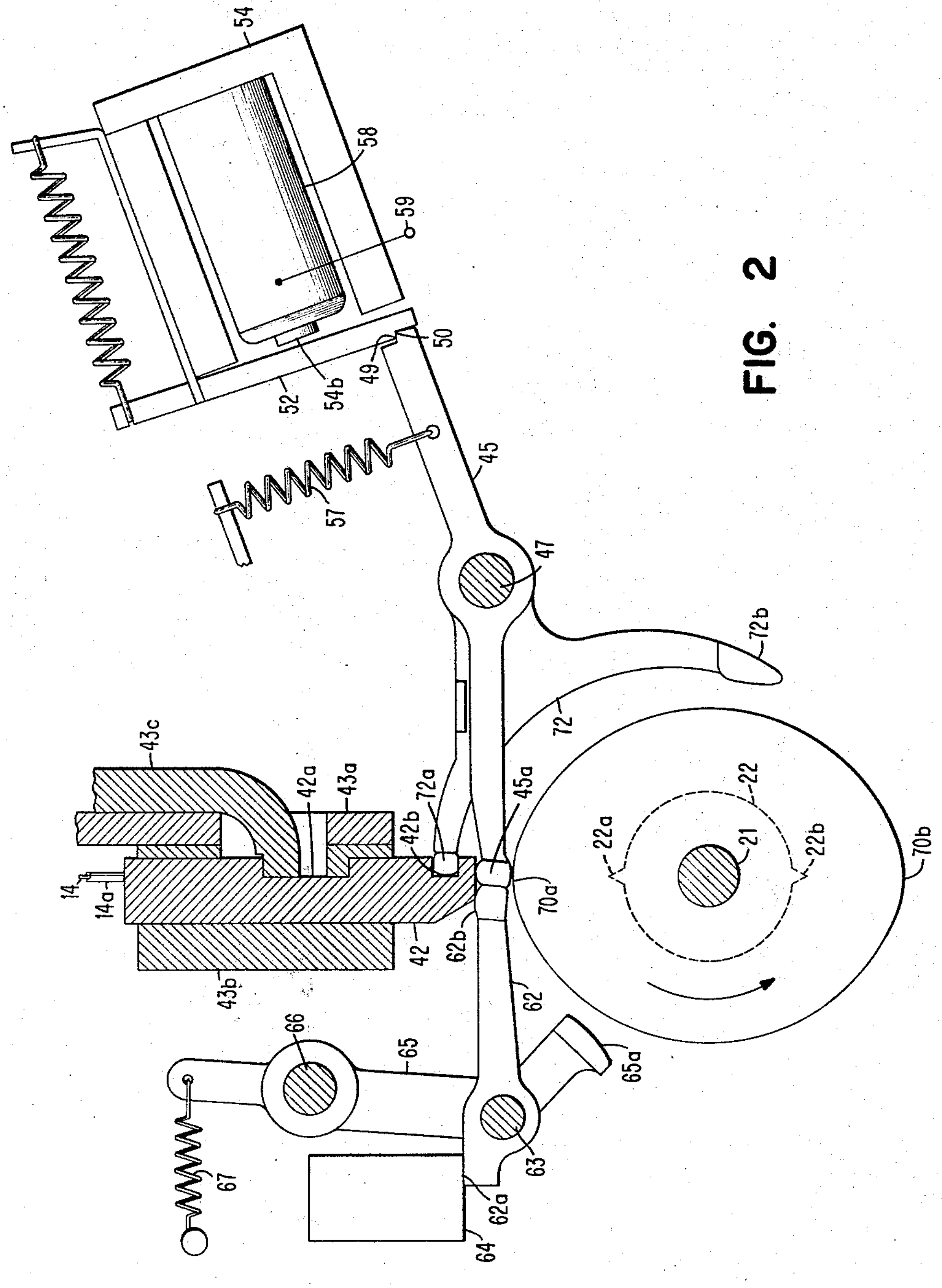
FIG. 2 is an enlarged partial view of a portion of the print wire drive mechanism, comprising generally an enlarged cross-sectional view of the drive unit shown in FIG. 1.
Figure 4A:
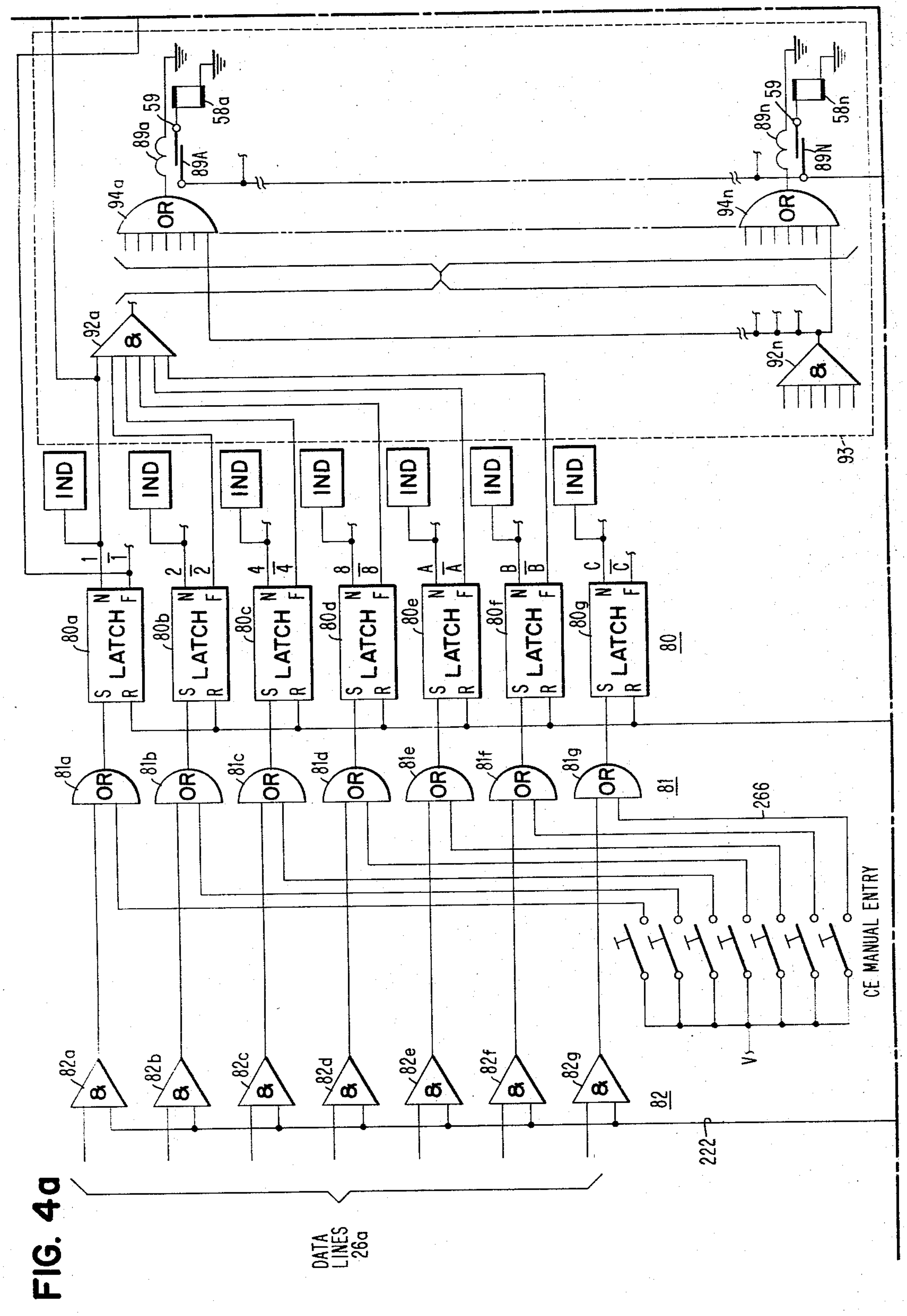
Figure 4B:
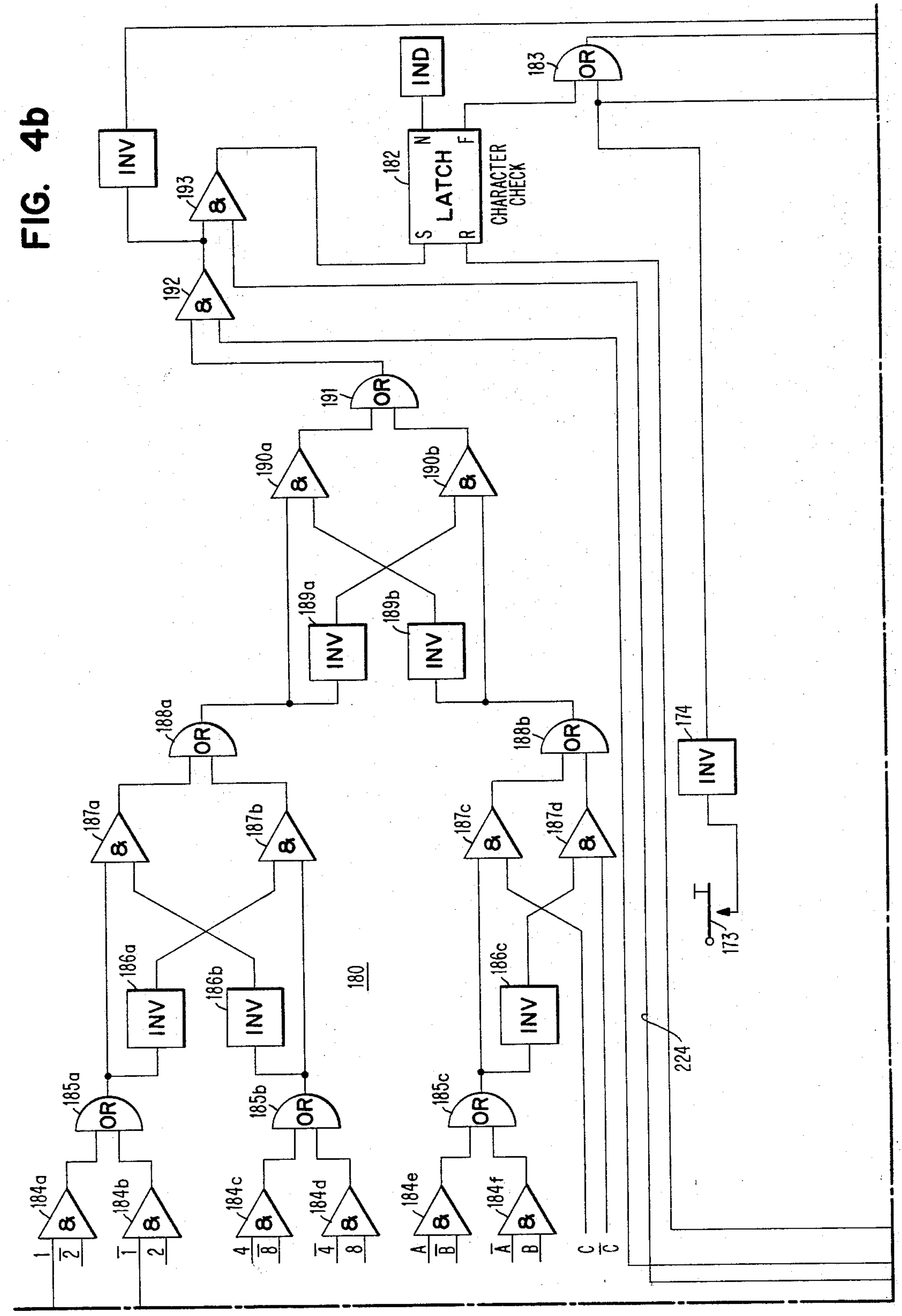
Figure 4C:
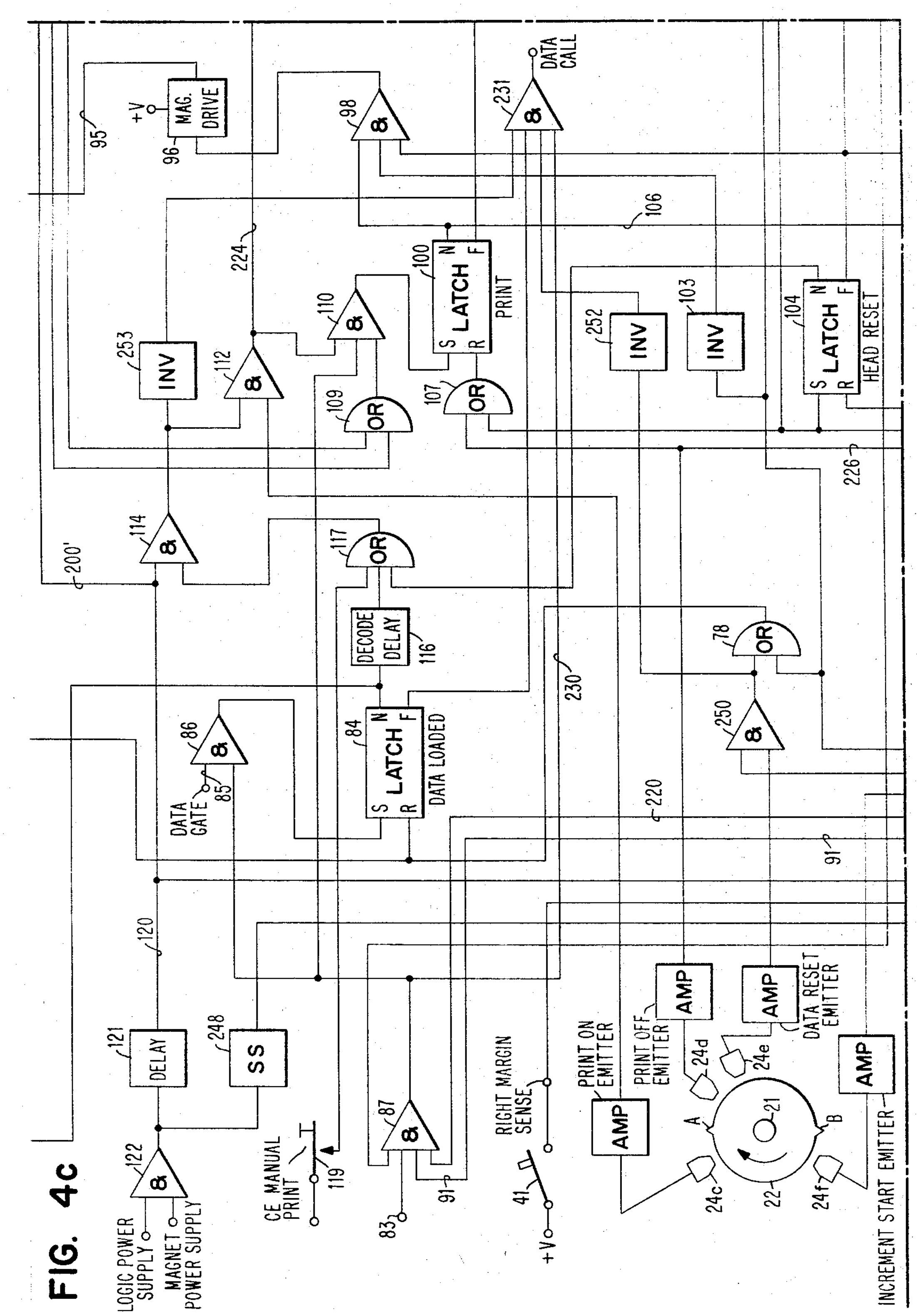
Figure 4D:
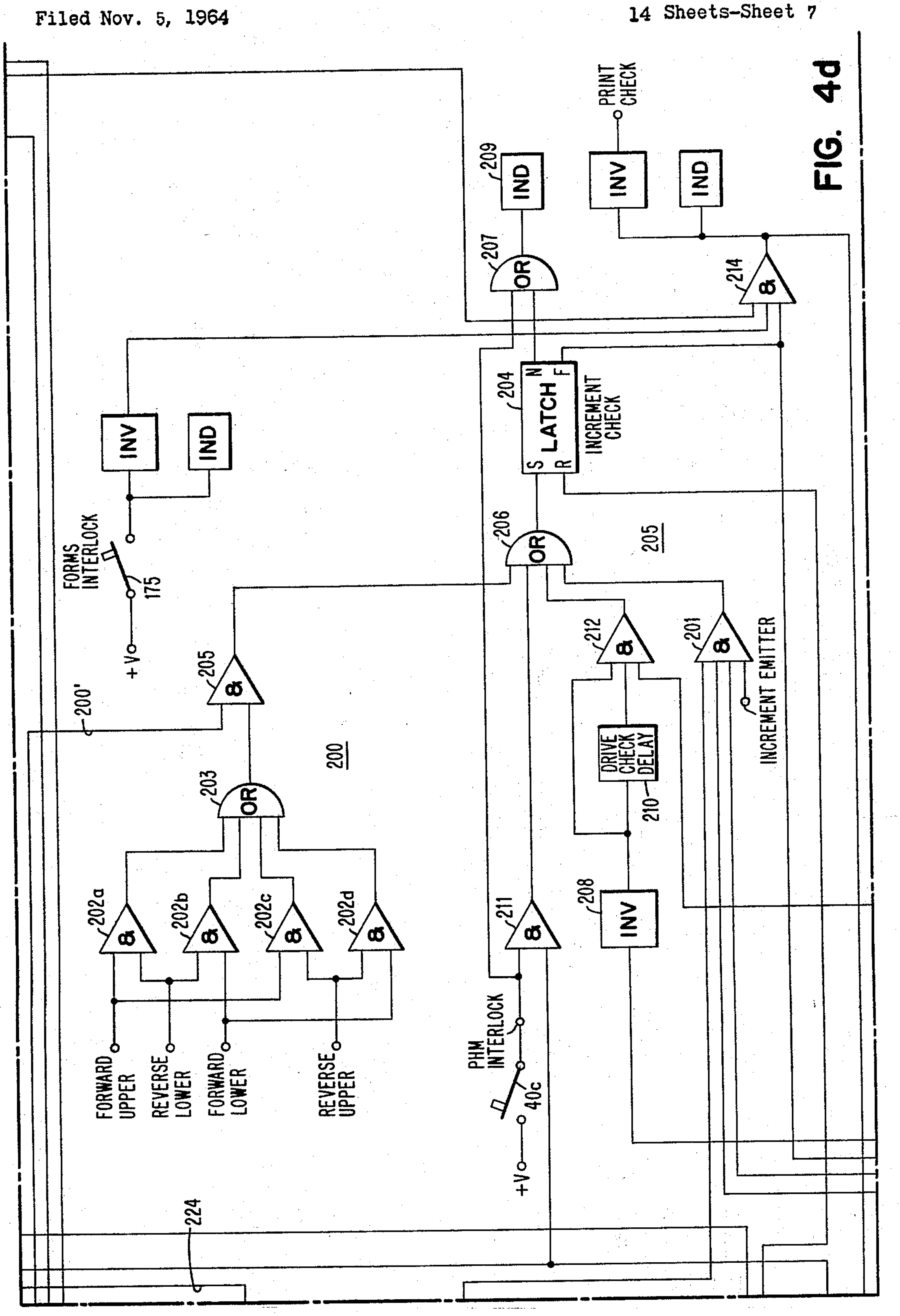
Figure 4E:
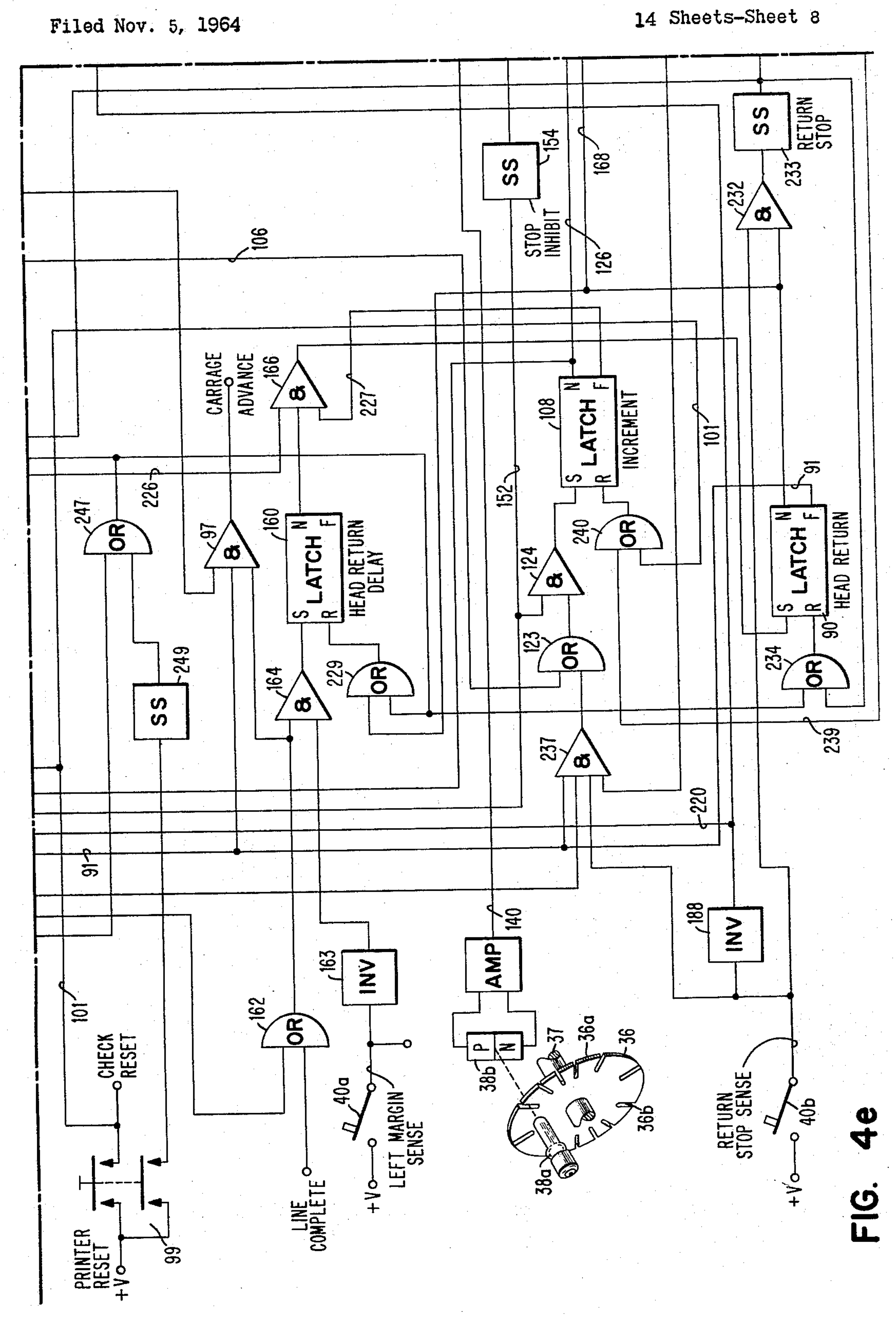
Figure 4F:
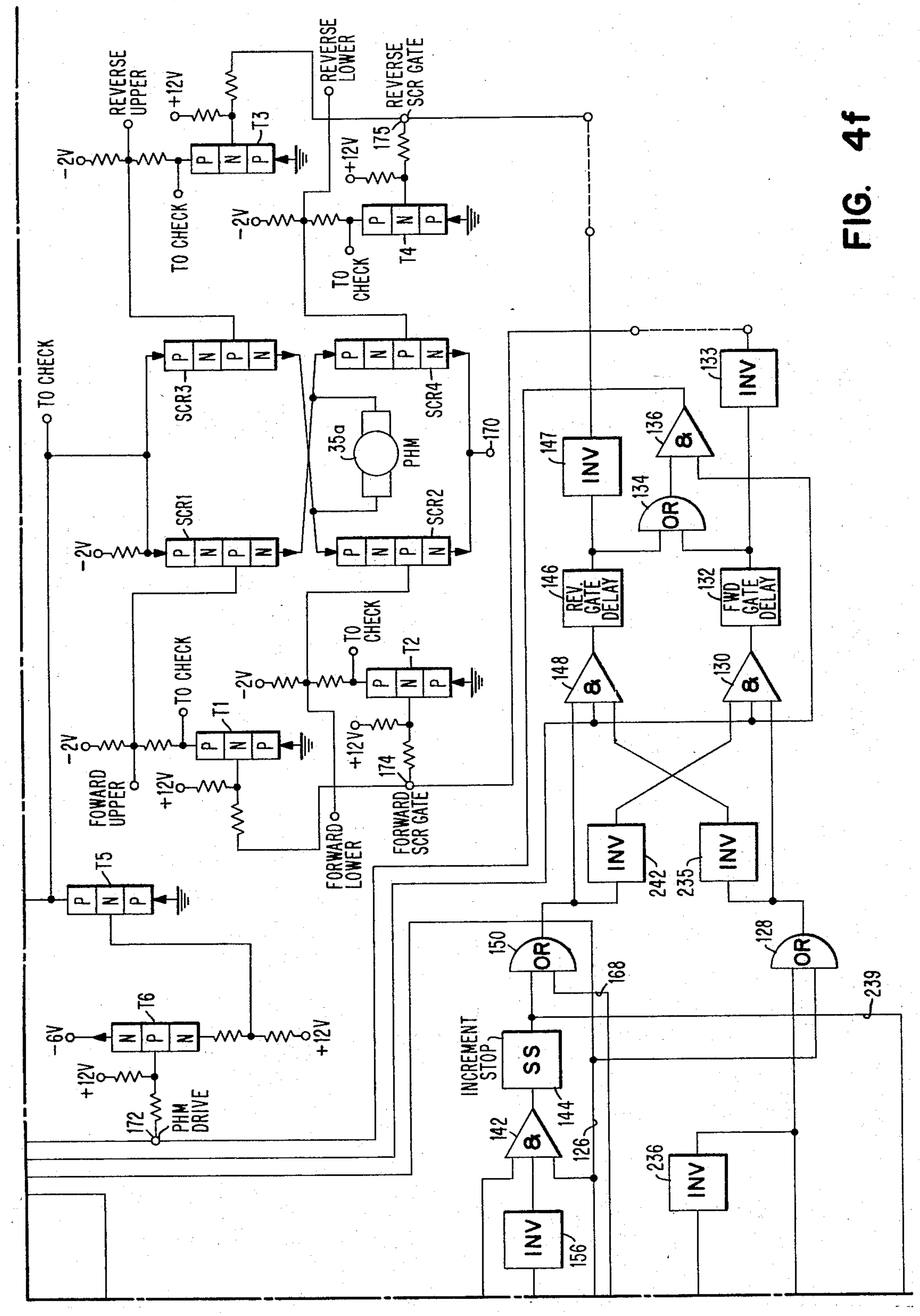

Referring to FIGS. 2, 4*a* and 4*c* of the drawings, it will be seen that when the magnet driver 96 is turned on to apply power to the drive magnets 58 of the selected magnets, the corresponding armature 52 will be retracted from the actuator 45, which thereupon will turn counterclockwise under the influence of the spring 57 to drop below the end of the interposer 62 as the cam 70 presents its low point. The interposer 62 is urged to the right by the spring 67 connected to the lever 65, and slides in over the end 45*a* of actuator 45 so that when the high lobe 70*b* of the cam raises the actuator 45, the end 62*b* of interposer 62, being disposed above the end 45*a* of the actuator 45, moves the print slug 47 sufficiently to advance the print wire 14 to the print position. When the high lobe 70*a* of the cam 70 engages the fork 72*b* of the restoring lever 72, the fork 72*a* positioned in the recess 42*a* of the drive slug returns the drive slug to the position shown. The actuator 45, when raised to the position shown by the high lobe of the cam, relatches with the armature 52 and is held in the inoperative position, the interposer 62 being withdrawn to the left, to the position shown, by the action of the cam high lobe 70*b* engaging the reset shoe 65*a* of the lever 65 to rotate it in a clockwise direction.

At the same time that the output of the Print Latch 100 is applied to the magnet driver 96 through AND circuit 98, the output is also applied over line 106 to turn on the Increment Latch 108 through OR circuit 123 and AND circuit 124. This operation is timed by gating the Print Latch On signal with an Increment Start emitter signal from the emitter pickup 24*f* as shown by the curves *a–e* of FIG. 5. When the Increment Latch 108 is turned on, the On output is applied over the conductor 126 to the AND circuit 142, and also through OR circuit 128 and AND circuit 130 to the Forward Gate Delay circuit 132. At the end of a 150 microsecond delay the output of the delay circuit 132 is applied to OR circuit 134 and AND circuit 136 to turn on the transistor T6 and the drive transistor T5. The output of the delay circuit 132 is also applied to the terminal 174 to gate the Forward Control transistors T1 and the T2 to turn on the Forward-Upper and Forward-Lower Silicon-Controlled Rectifiers, SCR1 and SCR2, respectively for effecting forward incrementing of the print head motor 35, thereby advancing the tape 30 and the print head 15 to the next print position.

The slotted emitter disc 36 is so positioned on the print head motor shaft 37 that as soon as the print head 15 approaches the next position, a slot 36*a* passes in front of the light source 38*a* and the photocell 38*b* produces a pulse. This pulse is applied over line 140 to AND circuit 142 to turn on the Increment Stop single shot 144, after a delay interposed by the Stop Inhibit single shot 154 and inverter 156, which opposes spurious stop signals. This effects a timed energization of the Reverse Gate Delay 146 to effect timed reverse energization of the print head motor 35*a* through Silicon-Controlled Rectifiers, SCR3–SCR4 for stopping the motor. The output of the Increment Stop single shot 144 is also applied to reset terminal of the Increment Latch 108 to turn the Increment Latch off as shown by curve *e* of FIG. 5, thus providing a single increment of the print head 15 to the next position. This removes the drive from the print wire setup magnets 58, the Print Latch 100 being reset by a Print Off emitter signal from the pickup 24*d* as shown by the curve *b* in FIG. 5.

At the end of a print line the return of the print head 15 will be effected either by a Line Complete signal from the central processing unit supplied through OR circuit 162, or the signal from the Right Margin Sense switch 41, which is closed when the print head reaches the right margin of the document. In response to either of the signals, the output of the OR circuit 162 is ANDed in AND circuit 164 with an inverted signal from the Left Margin Sense switch 40*a* through inverter 163 to turn on the Head Return Delay latch 160 to permit printing the last character. The On output of the Head Return Delay latch is ANDed in an AND circuit 166 with the Print Off emitter signal from emitter pickup 24*d* over conductor 226, and the Off output of the Increment Latch 108 over conductor 227. The output of AND circuit 166 is applied to set the Head Return latch 90, which resets the Head Return Delay latch 160 through OR circuit 229. The Data Call signal at AND circuit 231 is inhibited by the loss of the Off Head Return latch output signal over line 91, which drops the output of AND circuit 87 and removes its output over line 230 from the Data Call AND circuit 231. The On output of the Head Return latch 90 is applied over line 168, OR circuit 150, and AND circuit 148, to the Reverse Gate Delay circuit 146, to initiate the 150 microsecond Reverse Gate Delay signal. At the end of this delay, the output of the delay circuit 146 is applied to OR circuit 134 and AND circuit 136 to turn on the print head control transistor T5 through transistor T6, and at terminal 175 to the Reverse SCR gate transistors T3 and T4 to effect reverse operation of the print head motor 35 to return the print head 15 to the left. The print head 15 returns, and operates first the Left Margin Sense switch **40*a* and then the Return Stop Sense switch 40*b*. The output of the Return Stop Sense switch 40*b* is applied to AND circuit 232 to turn on the Return Stop single shot 233, which resets the Head Return latch 92 through OR circuit 234, and also supplies a signal to OR circuit 128 and thence to AND circuit 130 to the Forward Gate Delay circuit 132 for effecting energization of the print head motor 35 in the forward direction after a 150 microsecond delay. The output of the OR circuit 128 through inverter 235 turns off the AND circuit 148 and drops the Reverse SCR gate signal and the print head motor drive signal before the forward energization is effective. At the end of the 150 microsecond delay a check on the collector of the drive transistor T5 is made by the previously described Check Delay circuit 210. The Forward SCR signal from the Forward Gate Delay 132 and the print motor drive signal from the AND circuit 136** are then raised, so that forward energization of the print head motor is effected to stop the head return.

At the end of 4 milliseconds the signal from the single shot 233 through inverter 236 is effective with the Start emitter signal from pickup **24*f* in AND 124 to set the Increment Latch 108 through AND circuit 237 in conjunction with the Return Stop Sense signal from limit switch 40*b*, the Off signal from the Head Return latch 90, and the Interlock Delayed signal indicating that the power supply is okay. Turning on the Increment Latch 108 applies the On output over conductor 126 to OR circuit 128 and AND circuit 130 turning the Forward Gate Delay circuit 132. At the time the Forward Gate Delay timing is initiated, the 1.5 milliseconds Stop Inhibit single shot 154 is also turned on by the signal from the Increment start emitter pickup 24*f*. At the end of the 150 microsecond Forward Gate Delay, the output of the delay circuit 132 is applied to the OR circuit 134 and the AND circuit 136 to raise the print head motor drive, and the output is also applied to gate the Forward Silicon-Controlled Rectifiers SCR1 and SCR2 to advance or increment the print head. At the end of the 1.5 milliseconds Stop Inhibit single shot signal, the output of the inverter 156 rises, and the feedback emitter 36 is effective to apply a signal over line 140 to the AND circuit 142 to turn it on and fire the Increment Stop single shot 144. This applies an output over conductor 239 to reset Increment Latch 108 through OR circuit 240. At the same time the output is applied to OR circuit 150, AND circuit 148 and Reverse Gate Delay circuit 146. The output is also applied from the OR circuit 150 through inverter 242 to drop the output of AND circuit 130** and thus drop the print head motor drive and the Forward SCR gate signals.

At the end of the 150 microsecond drive gate delay the collector voltage at the drive transistor T5 is checked by the Drive Check Delay circuit 210, and the output of the Reverse Gate Delay circuit 146 is applied to OR circuit 134 and AND circuit 136 to turn on the drive transistor T5 and gate the Reverse SCR control transistors T3 and T4 to effect reverse energization of the motor 35 to bring it to a stop. At the end of the 1.8 millisecond timing of the Increment Stop single shot 144 the output to the Reverse Gate Delay circuit 146 is dropped, thus dropping the print head motor drive signal and the Reverse SCR gate signal. The Drive Check Delay circuit 210 is thereupon energized through inverter 208. At the end of the check delay period the collector of the drive transistor T5 is checked by the Check Delay circuit. The operation continues with the head incrementing until the head leaves the Return Stop Sense switch **40*b* which removes its signal from the AND circuit 237 and prevents further operation of the Increment Latch 108**, so that the print head returns to the first print position in the required 2 to 3 increments.

In the event that the Printer Reset button 99 is depressed, it may be seen from FIGS. 4*a*–4*f* and the flow chart of FIG. 7 that a short pulse output is applied through OR circuit 247 by single shot 249 to set the Head Reset latch 104. This signal is also applied to OR circuit 229, OR circuit 234 and OR circuit 107 to effect reset. A reset signal is also applied to OR circuit 78 and OR circuit 240 for reset. The output of the Head Reset latch is applied through the OR circuit 117 and the AND circuit 114, AND circuit 112, and AND circuit 110 to effect operation of the Print Latch 100. The output of the Print Latch is applied over line 106 to return on the Increment Latch 108 through OR circuit 123 and AND circuit 124. Incrementing of the print head 15 is thereby effected in the manner hereinbefore described until the print head reaches the right margin whereupon the Right Margin Sense switch **42*c* is operated to apply a signal to OR circuit 162 and then through AND circuit 164 to set the Head Return Delay latch 160. Operation of the print head drive motor 35** is thereupon effected in the manner hereinbefore described for a normal head return to return the head to the left margin.

Single shot 248 provides a similar reset pulse through OR circuit 247 for resetting the Print Latch, Head Return and Head Return Delay latches, while setting the Head Reset latch when power is applied to the control circuit. A Data Call signal is produced by AND circuit 231 to indicate to the central processing unit that the printer is ready for more data. AND circuit 231 ANDs the output of AND 250 through inverter 252 with the output of AND 87, the inverted output of AND 114 through inverter 253, and the Off output of the Data Loaded latch 84.

From the above description it will be apparent that there has been provided a control circuit for effecting positive and reliable operation of the print head motor to effect incrementing from one print position to another in timed relation with the operation of the print wire drive mechanism. Accurate positioning during incrementing is effected by the utilization of a feedback signal from the print head motor emitter and this is enhanced by the use of a Stop Inhibit single shot which inserts a timed delay during the stopping operation, so as to prevent vibration during starting and stopping from causing spurious stop signals at start time. Accurate positioning of the head at the first print position is effected without the use of detents by permitting the head to overshoot the first print position upon return, and then incrementing the head in the forward direction back to the first print position, the normal feedback effecting connection within 3 increments. In this respect, when the head is returned by a printer reset signal, operation of the head is caused to increment the head all the way to the right margin before returning it to the left margin, so as to permit the head to gain sufficient speed to effect enough overtravel to accurately position the head by incrementing upon return. By checking the collector of the drive transistor it is assured that the drive transistor turns off, so that it prevents the Silicon-Controlled Rectifiers from turning on in the event of a drive transistor turnoff failure. In addition, provision is made for checking the Silicon-Controlled Rectifier gate signals to determine that the forward and reverse Silicon-Controlled Rectifiers are never on together.

While the invention has been particularly shown and described with reference to a preferred embodiment thereof, it will be understood by those skilled in the art that various changes in form and details may be made therein without departing from the spirit and scope of the invention.

What is claimed is:

1. In combination,
a character register,
a print head having drive means including a motor reversibly operable to move the head forward toward the right margin or in reverse toward the left margin of a record form and having a plurality of print wires arranged in a matrix,
cyclic drive means for the print wires including control means individual to each of the print wires selectively operable to effect movement of its wire to print on the form,
means selecting predetermined ones of the control means in accordance with a character in the register,
means operated by the cyclic drive means to produce timed signals to effect operation of the selected control means and an incremental forward operation of the print head drive means to advance the print head in a plurality of steps to a selected print position,
means responsive to incremental advance of the print head to the right margin to effect continuous reverse operation of the print head motor to return the head to the left margin,
and means responsive to return of print head to a position beyond the left margin to effect incremental forward operation of the print head motor to return the print head to the left margin in a plurality in incremental steps.

2. In combination,
a print head having drive means reversibly operable to move the head across a record form having right and left margins in either direction and having a plurality of character defining print wires arranged in a matrix,
cyclic drive means for the print wires including control means individual to each print wire selectively operable to move its print wire to print on the record form,
means effecting operation of the control means and incremental operation of the print head drive means to advance the print head toward the right margin in a plurality of steps,
means responsive to the print head advancing to the right margin to effect reverse operation of the print head drive means to return the head toward the left margin,
switch means responsive to return of the head to stop the head a predetermined distance beyond the left margin,
and means including said switch means effecting incremental operation of the print head drive means to advance the print head in a plurality of incremental steps from said predetermined distance to the left margin.

3. In combination,
a character register,
a print head having reversibly energizable drive means operable to move the head in opposite directions across a document having right and left margins and having a plurality of character defining print wires arranged in a matrix,
cyclic drive means for the print wires including control means selectively operable to effect operation of its print wire by the cyclic drive means and emitter means for producing pulse signals in timed relation with each cycle of said drive means,
means selecting predetermined ones of the control means in accordance with a character in the register,
means effecting operation of the selected control means and incremental advance of the print head in response to pulse signals produced by operation of the cyclic drive means,
means effecting continuous reverse energization of the drive means in response to a print line complete signal from a central processing unit to return the print head toward the left margin,
means including a limit switch operated by the print head responsive to return of the print head to a point beyond the left margin to effect reverse energization of the drive means to stop the print head after a predetermined amount of overtravel,
and means responsive to operation of said limit switch and operation of the cyclic drive means to incrementally operate the print head drive means in the forward direction a plurality of times to return the print head to the left margin.

4. In a printer,
a character register,
a print head having drive means energizable to move it across a record form and having a plurality of print wires in a character defining matrix,
cyclic drive means including a cam and interposer for each of the print wires having electromagnetic activating means selectively operable to effect actuation of an associated print wire to print on said form,
emitter means actuated by the cyclic drive means to produce timed pulses at predetermined points in each cycle of operation of the drive means,
means selecting predetermined ones of the activating means in accordance with a character in the register,
latch means responsive to pulses from said emitter means operable to effect incremental forward operation of the print head drive means to advance the print head,
stop means effecting a predetermined timed energization of the print head drive means in the reverse sense to stop forward movement of the print head,
means responsive to movement of the print head a predetermined amount to produce a signal for effecting operation of said stop means and reset the latch means,
and means delaying the application of said signal to said stop means for a predetermined interval.

5. In a printer,
a character register,
a print head having drive means moving the print head in opposite directions across a record form and having a plurality of print wires arranged in a matrix,
cyclic drive means including control means individual to each print wire selectively operable to effect actuation of its print wire by the cyclic drive means to print on the form,
means selecting predetermined ones of the control means in accordance with a character in the register,
a bridge circuit of controlled rectifiers connected to effect reverse operation of the print head drive means,
semi-conductor switch means connected in series with said bridge circuit,
means gating one pair of rectifiers in opposite legs of the bridge circuit to effect forward operation of the drive means,
other means gating the other pair of rectifiers to effect reverse operation of the print head drive means,
input drive means responsive to gating of either pair of rectifiers for turning on the semi-conductor switch means,
check means responsive to saturation of the semi-conductor switch means a predetermined time after the input drive means turns off, for indicating an error condition.

6. In a printer,
a character register,
a print head having drive means operable to move the print head across a record form in opposite directions and having a plurality of print wires arranged in a character defining matrix,
cyclic drive means including control means individual to each print wire selectively operable to effect activation of its print wire by the cyclic drive means to print on said form,
means selecting predetermined ones of said control means in accordance with a character in said register,
means including a bridge circuit of controlled rectifiers arranged in oppositely disposed pairs to effect energization of the print head drive means in opposite senses,
semi-conductor switch means connected in series with said bridge circuit,
means including a latch responsive to operation of the cyclic drive means to apply a forward gate signal to one pair of controlled rectifiers to effect operation of the drive means in the forward direction,
means including a latch responsive to movement of the print head drive means to apply a gating signal to the other pair of controlled rectifiers to effect operation of the drive means in the reverse direction,
means responsive to either of the aforesaid gating signals to apply a gating signal to the semi-conductor switch means,
and means responsive to simultaneous gating signals in opposite direction to inhibit gating of the semi-conductor switch means.

7. In a printer,
a character register,
a print head having drive means including a motor with a drive shaft operable to move the print head to different print positions on a record form and having a plurality of print wires arranged in a character defining matrix, continuously running drive means including selectively operable control means individual to each print wire causing the continuously running drive means to actuate an associated print wire to print on the form,
translator means connecting the register and the control means operable to select predetermined ones of said control means in accordance with a character in the register,
means including an increment latch operable to produce a forward gating signal,
means including a print latch operable to effect operation of the selected control means and apply a control signal to effect operation of the increment latch,
emitter means driven by the cyclic drive means connected to apply timed signals to the print latch and the increment latch to effect operation thereof,
means including an emitter mounted on the print head motor drive shaft to produce a reverse gating signal for effecting stopping of the print head after a predetermined movement and reset of the increment latch,
means including a head return latch connected to produce a reverse gating signal,
and delay means connected to delay application of said forward and reverse gating signals to the print head drive means.

References Cited by the Examiner

UNITED STATES PATENTS

| | | | |
|---|---|---|---|
| 2,708,020 | 5/1955 | Wockenfuss | 197—1 |
| 2,911,085 | 11/1959 | Leathers | 197—1 |
| 2,997,152 | 8/1961 | Dirks | 197—1 |
| 3,002,678 | 10/1961 | Jackowski | 234—114 |
| 3,087,420 | 4/1963 | Brehm | 101—93 |
| 3,167,166 | 1/1965 | Schiebeler | 197—1 |
| 3,192,854 | 7/1965 | Martin | 101—93 |
| 3,236,351 | 2/1966 | Fitch et al. | 197—1 |

ROBERT E. PULFREY, *Primary Examiner*.

E. S. BURR, *Assistant Examiner*.